Aug. 6, 1929.                J. A. WRIGHT                1,723,537
                          STEERING MECHANISM
                         Filed March 3, 1927
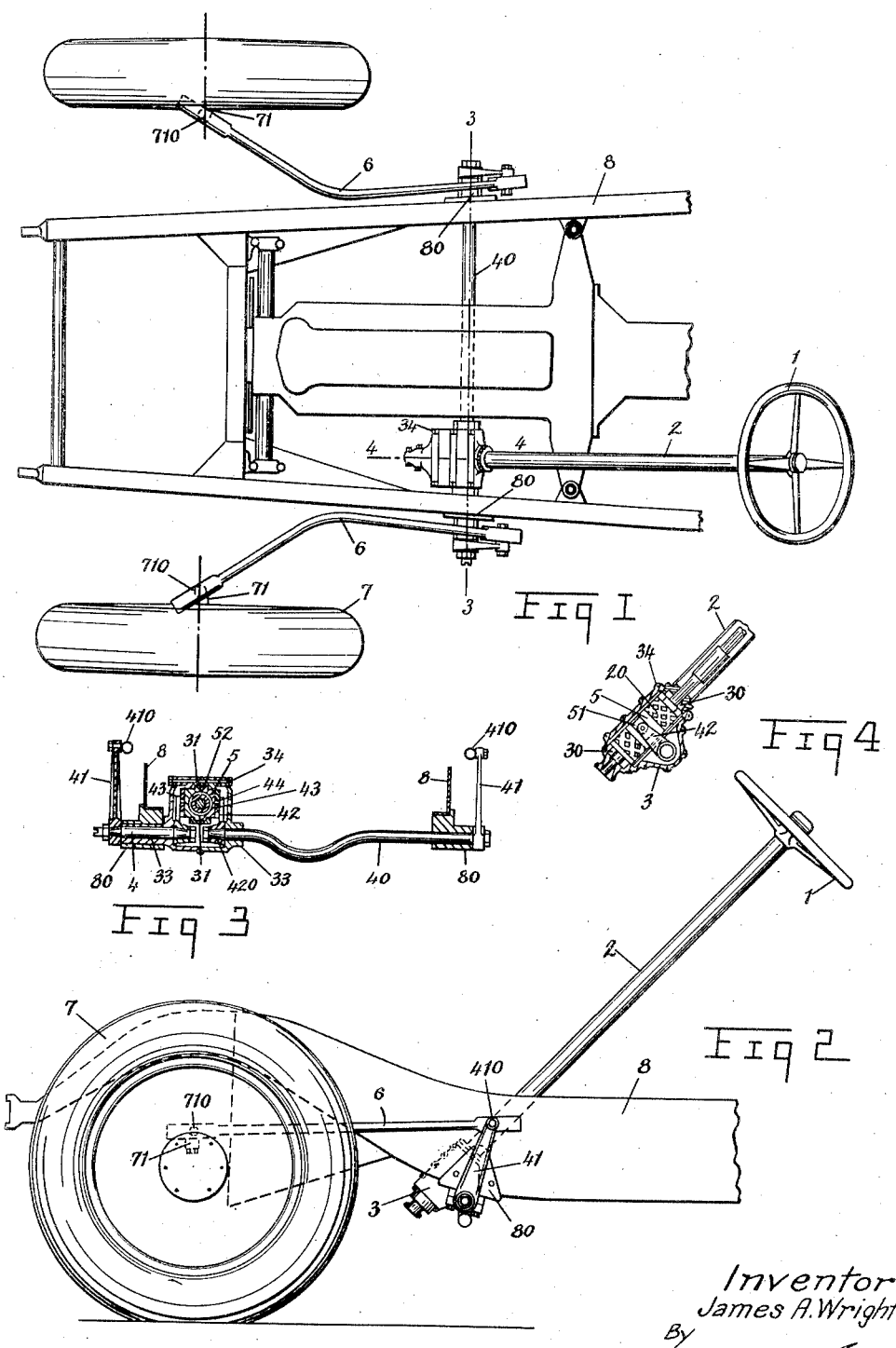
Inventor
James A. Wright
By
Attorney Patented Aug. 6, 1929.

1,723,537

UNITED STATES PATENT OFFICE.

JAMES A. WRIGHT, OF MONTREAL, QUEBEC, CANADA.

STEERING MECHANISM.

Application filed March 3, 1927. Serial No. 172,488.

This invention relates to the steering mechanism of motor vehicles and particularly to means to control the steering wheels by independent means.

The object of the invention is to provide a steering mechanism by means of which each steering wheel is directly and positively controlled from the hand wheel.

A further object is to eliminate the cross bar which at present couples the steering wheels.

A further object is to reduce the number of connections between the steering post and the wheels and thereby minimize backlash and its effects.

A further object is to provide a dual steering gear, each half of which controls one of the steering wheels.

The invention consists in providing a pair of rocker shafts which when operated by the hand wheel rotate in opposite directions, each rocker shaft being coupled to the steering wheel on its side of the car.

Reference is made to the accompanying drawings in which

Figure 1 is a plan view of the device.

Figure 2 is a side view of the same.

Figure 3 is a cross section on the line 3—3 of Figure 1.

Figure 4 is a cross section on the line 4—4 of Figure 1.

The steering post 2, controlled by the hand wheel 1 is journalled at its lower end in roller bearings 30 in the casing 3.

The casing 3 is divided vertically in two parts through the axis of the steering post 2. The left hand part has a sleeve 33 extending at right angles. This sleeve 33 is mounted in a bracket 80 in the side frame 8 of the chassis, and provides a bearing for the left hand rocker shaft 4.

The right hand part of the casing 3 has a short sleeve 33 to provide a bearing for one end of the right hand rocker shaft 40, the other end being journalled in a bracket 80 on the side frame 8.

The two sides of the casing 3 are secured together by a series of bolts 34, across the top and bottom of the casing 3.

Mounted on the steering post 2 within the casing 3 is a compound threaded sleeve 20.

A nut 5 split vertically has lugs 52 which travel in slideways 31 in the casing 3 above and below the threaded sleeve 20. Each half of the nut 5 is oppositely threaded, so as to travel in different directions when the steering post 2 is rotated. Each half of the nut 5 has a groove 51 on its outer side, running at right angles to the steering post 2, in which a sliding block 44 travels.

Mounted on the conical ends of the rocker shafts 4—40 are crank levers 42 having conical bushings 420 at one end and studs 43 at the other end which enter the blocks 44.

Steering arms 41 are mounted on the outer ends of the rocker shafts 4—40 beyond the brackets 80, having ball joints 410 at their ends. Similar ball joints 710 on the steering arms 71 of the wheels 7 are connected on each side by drag links 6.

With a construction as above set forth, each wheel is directly controlled from the hand wheel, by means of a minimum number of parts. By this means backlash and its injurious effects are reduced to a minimum.

The elimination of the cross tie-bar prevents road shocks from being transferred to both wheels, and also prevents the two wheels from syncronizing.

When the front wheels are mounted with castor action their independent movement will provide greater safety, and this is particularly the case should the steering connections of one of the wheels become loose.

By means of this construction, the tendency to wobble or shimmy in the front wheels, will be to a great extent done away with.

I claim:

1. In a steering gear, a casing, a steering post journalled therein, a compound threaded sleeve mounted thereon within the casing, a split nut with oppositely threaded halves, meshing with the threaded sleeve and having longitudinal ribs sliding in slots in the casing, with rocker shafts journalled in an offset portion of the casing, having levers on their ends within the casing, the ends of which are slidingly pivoted in slots in the adjacent halves of the split nut, and connections from the rocker shafts to steering wheels.

2. In a steering gear, a rectangular casing having a dependent offset portion, a steering post journalled therein, a compound threaded sleeve mounted thereon within the casing, a split nut with oppositely threaded halves, meshing with the threaded sleeve and slidingly mounted in the casing, rocker shafts journalled in the offset portion of the casing below the threaded sleeve, having levers on their ends within the casing, the opposite ends of which extend upwards and have pins pivoted in blocks sliding in slots in the adjacent halves of the split nut, and connections from the rocker shafts to steering wheels.

JAMES A. WRIGHT.